United States Patent [19]
Gattuso et al.

[11] Patent Number: 5,223,551
[45] Date of Patent: Jun. 29, 1993

[54] UREA-MODIFIED ISOCYANURATES AND METHOD OF MAKING RIGID FOAMS THEREOF

[75] Inventors: Mark J. Gattuso, Palantine; David W. House, Arlington Heights; Ray V. Scott, Jr., Schaumburg, all of Ill.

[73] Assignee: UOP, Des Plaines, Ill.

[21] Appl. No.: 813,559

[22] Filed: Dec. 26, 1991

[51] Int. Cl.$^5$ .............................................. C08G 18/32
[52] U.S. Cl. ................................... 521/163; 521/902; 521/131
[58] Field of Search ................................. 521/163, 902

[56] References Cited

U.S. PATENT DOCUMENTS

| | | | |
|---|---|---|---|
| 3,909,465 | 9/1975 | Wiedermann et al. | 521/163 |
| 4,425,446 | 1/1984 | Malwitz et al. | 521/108 |
| 4,578,446 | 3/1986 | House et al. | 528/64 |
| 4,801,674 | 1/1989 | Scott, Jr. et al. | 528/68 |

FOREIGN PATENT DOCUMENTS 126460 7/1977 German Democratic Rep.

OTHER PUBLICATIONS

Ashida, Polyisocyanurate Foams, Chap. 6, *The Handbook of Polymeric Foams and Foam Technology*, edited by D. Klempner and K. C. Frisch, Hauser Publishers, 1991, p. 96.

Ashida, ibid. pp. 97–98.

Gattuso et al., *Secondary Amine Extended Flexible Polyurethane-Area Foams, Polyurethanes 88, Proceedings of the S.P.I. 31st Annual Technical/Marketing Conference*, Oct. 19–21, 1988.

*Primary Examiner*—John Kight, III
*Assistant Examiner*—Rachel Johnson
*Attorney, Agent, or Firm*—Thomas K. McBride; Eugene I. Snyder; Jack H. Hall

[57] ABSTRACT

Rigid urea-modified polyisocyanurate foams with improved dimensional stability and flame retardancy have densities of 1–12 p.c.f., a limiting oxygen index greater than 22 and dimensional changes at 100% R.H. and 70° C. of less than 2% in any linear dimension and a method of making same. The method comprises reacting an organic polyisocyanate, a blowing agent and an N,N'-dialkyl aromatic diamine in the presence of a trimerization catalyst and, if water is used as the blowing agent, a blowing catalyst, wherein the N,N'-dialkyl aromatic diamine and an amine produced by water, if used, constitute the sole sources of active hydrogen.

8 Claims, No Drawings

UREA-MODIFIED ISOCYANURATES AND METHOD OF MAKING RIGID FOAMS THEREOF

FIELD OF THE INVENTION

The present invention relates to rigid polymeric foams. Specifically, the invention relates to urea-modified isocyanurate rigid foams and a method for making such foams.

BACKGROUND OF THE INVENTION

Rigid polyurethane foams are recognized as excellent thermal insulation materials. Yet, they are not truly flame retardant. Isocyanurate foams are considerably more flame-retarding, but the unmodified foams made therefrom are highly cross-linked and are extremely brittle. Previous attempts have been made to reduce the brittleness of the isocyanurate foams by employing modifiers to reduce the amount of cross-linking. For example, flame-retardant urethane-modified polyisocyanurate rigid foams have been known since 1966 (Ashida, Polyisocyanurate Foams, Chap. 6, *The Handbook of Polymeric Foams and Foam Technology*, edited by D. Klempner and K. C. Frisch, Hauser Publishers, 1991, p 96); also amide-, carbodiimide- and imide-oxazolidone-modified polyisocyanurate foams. Ashida, ibid, p 97–8. Heat resistant and flame-retardant polyisocyanurate-polyurea foams prepared by reaction of diisocyanates with aqueous solutions of trimerization catalysts were disclosed in East German Patent 126,460. Urea-modified isocyanurate foams were disclosed in U.S. Pat. No. 4,425,446. The disclosed foams were useful in retrofitting wall cavities with insulating material, in that the material was substantially completely risen before setting or gelling. The urea-linkages were formed by an initial reaction between water and a multifunctional isocyanate which causes early rising of the foam. Additionally, the patentee discloses further modification of the formulation by the addition of a primary or secondary terminated polyamine, to form additional urea linkages. The polyisocyanurates of the present invention have rise times which exceed their gel times and set times.

Secondary amines have previously been proposed as curing agents for TDI-based flexible polyurethane foams, Gattuso et al *Secondary Amine Extended Flexible Polyurethane-Urea Foams*, Polyurethanes 88, Proceedings of the S.P.I. 31st Annual Technical/Marketing Conference, Oct. 19–21, 1988.

U.S. Pat. No. 3,846,351 describes the use of secondary phenylene diamines in combination with polyols as catalysts and chain extenders in the production of flexible polyurethane foams. More recently, it has been shown in U.S. Pat. No. 4,578,446 to House et al that N-alkylated methylenedianilines are suitable curing agents for urethane prepolymers, i.e., in elastomer production via non-RIM processes. In U.S. Pat. No. 4,801,674 to Scott et al, N-alkylated methylene dianilines are disclosed as suitable curing agents for RIM applications. However, neither patent discloses the unexpected beneficial results achieved with the rigid polyisocyanurate foams present invention.

SUMMARY OF THE INVENTION

The invention relates to a rigid urea-modified polyisocyanurate composition with improved dimensional stability and flame retardency and a method for making the same. The method for making a dimensionally stable rigid urea-modified polyisocyanurate having a density of from 1–12 p.c.f., dimensional stability at 100% relative humidity (R.H.) and 70° C. of less than 2% change in linear dimension in any direction and a limiting oxygen index (L.O.I) greater than 22 comprising reacting an organic polyisocyanate, a blowing agent and an N,N'-disubstituted aromatic diamine having the structure

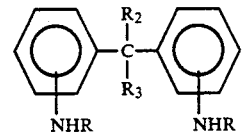

where R is selected from the group consisting of a monovalent alkyl- or alkenyl moiety containing from 3 to about 20 carbon atoms or a monovalent aromatic moiety containing from 6 to about 10 carbon atoms, $R_2$ is H or $C_1$, $C_2$ or $C_3$ alkyl group and $R_3$ is H or a $C_1$, $C_2$ or $C_3$ alkyl group in an amount such that the NCO/NH ratio is from 1 to 9 in the presence of a catalytically effective amount of a first catalyst which catalyzes the blowing reaction between an isocyanate and water, if water is used as a blowing agent, and a second trimerization catalyst which catalyzes the formation of isocyanurate bonds, said diamine and an amine produced by water, if used as a blowing agent, constituting the sole sources of active hydrogen.

The foams of the invention are commercially desirable because of their reduced flammability, lower friability, excellent insulating properties and dimensional stability compared to available polyisocyanurate foams. Also important is the greater isotropicity imparted to the rigid foams through the use of specific N,N'-di-sec-alkyl-substituted aromatic diamines, i.e., the greater uniformity of load-bearing properties between the directions, parallel to rise and perpendicular to rise.

In a preferred embodiment, also, the invention relates to a dimensionally stable, rigid urea-modified polyisocyanurate having substantially no urethane linkages and a density of 1.5–6.

DETAILED DESCRIPTION OF THE INVENTION

Although rigid foam polyisocyanurates modified only by urea linkages have been proposed for the application in retrofitting wall cavities with insulating material, a reaction in which the gel time was longer than the initial rise time is required. Moreover, there was no requirement for dimensional stability since the walls provided the necessary boundaries and warping or shrinking after installation is of relatively minor importance.

On the other hand, it is essential to the production of uniform insulating panels for original building construction that the panels be dimensionally stable after their formation and not be subject to shrinkage or warping or aging. This latter objective is achieved by reacting a polyfunctional isocyanate composition primarily with a polyfunctional amine in the presence of a blowing catalyst and a trimerization catalyst to produce a rigid isocyanurate foam. A major amount of the urea linkages in the final rigid foam is derived from the polyfunctional amine, although water may be used as a blowing agent, alone or with other known blowing agents, and will react with the polyfunctional isocyanate to produce additional urea linkages. In any case, it is important that the amines and, optionally water, as a blowing agent, are the sole source of active hydrogen, i.e., the sole isocyanate-reactive materials in the reaction mixture to avoid the formation of other types of linkages in the final rigid foams, such as urethane linkages (from polyols). A first catalyst, such as those known in the art as blowing catalysts, is incorporated in the reaction mixture if water is used as a blowing agent. A second catalyst known for promoting the trimerization reaction to produce an isocyanurate is also incorporated in the reaction mixture. In accordance with the invention, the initial reaction taking place, catalyzed by the blowing catalyst, is between the water, if present as a blowing agent, and a polyfunctional isocyanate to form a primary amine. Next, the primary amine, if water is present, and the polyfunctional amine react with additional polyfunctional isocyanate molecules to produce an isocyanate-capped substituted urea intermediate compound in the following manner:

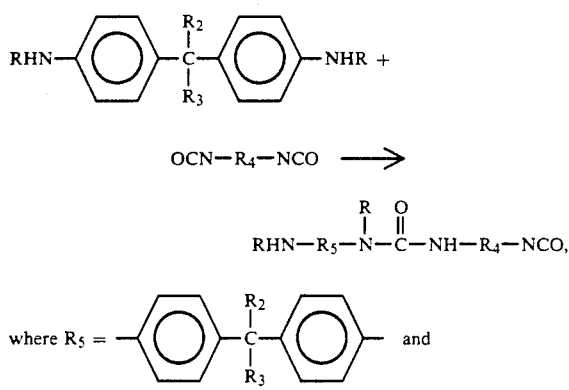

$R_4$ is a divalent alkaryl or aryl group and $R, R_2$ and $R_3$ are as defined hereinbefore. Thus, if

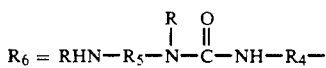

the final reaction, catalyzed by the trimerization catalyst, is as follows:

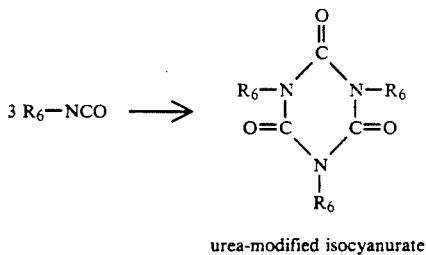

urea-modified isocyanurate

The incorporation of water in the reaction mixture as the blowing agent causes the formation of additional urea linkage in the final foam product as well as produces carbon dioxide to form the cells of the foam. Alternatively, part or all of the water may be replaced by a conventional blowing agent such as chlorofluorocarbons hydrochlorofluorocarbons (HCFC), hydrofluoroalkanes (HFA), acetone, methylenechloride, methychloroform, etc. "Handbook for Reducing and Eliminating CFC's in Flexible Polyurethane Foams", EPA Publication 21A-4002, April 1991, page 21 et seq.

The product is a rigid urea-modified isocyanurate foam having substantially no urethane linkages, excellent insulating properties, is non-friable and exhibits flame retardance, dimensional stability on aging and a density of 1 to 12 p.c.f., preferably 2 to 8 p.c.f. and most preferably 1.5 to 6 p.c.f.

Flame retardancy, as measured by the Butler Chimney Test, is excellent and is in the range 71% to 98%.

Multi-functional isocyanates which can be used in the invention are well known in the production of polyurethanes and polyureas and include monomers and polymers containing at least two isocyanate groups. Thus, diisocyanates and higher functionality polyisocyanates are intended and include both aliphatic and aromatic multifunctional isocyanates such as 2,4- and 2,6-toluene diisocyanate and mixtures thereof (inclusively referred to sometimes as TDI); diphenylmethane diisocyanate (MDI), polymeric MDI (PAPI-27) and modified MDI.

Blowing catalysts are well known. However, catalysts used in the present invention must provide a reaction profile such that the blowing reaction of water and the multifunctional isocyanate is more rapid than the trimerization reaction and is substantially complete prior to the formation of the isocyanurate. Suitable blowing catalysts include: bis-dimethyl aminoethyl ether (NIAX A-1 sold by Union Carbide) dimethylamino-ethoxylethanol, N,N-dimethyl-3-[2-dimethyl amino ethoxy]propylamine (Thancat DD sold by Texaco), triethylene diamine (Dabco 33LV).

Trimerization catalysts are also well known. In the present invention, the formation of isocyanurates takes place after the urea reaction has substantially been completed. Any of the conventional trimerization catalysts can be used in the invention including the following representative examples: TMR-2 from Air Products, substituted triazines, such as Polycat 41 from Air Products, alkali metal salts of organic acids such as potassium octoate or hexoate, phospholines, etc.

The sole isocyanate-reactive component (i.e., sole source of active hydrogen), except when water is used as the blowing agent, is an N,N'-disubstituted aromatic secondary diamine of the following structure,

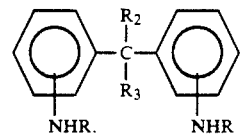

where R is selected from the group consisting of a monovalent alkyl or -alkenyl moiety containing from 3 to about 20 carbon atoms or a monovalent aromatic moiety containing from 6 to about 10 carbon atoms, $R_2$ is H or $C_1$, $C_2$ or $C_3$ alkyl and $R_3$ is H or $C_1$, $C_2$ or $C_3$ alkyl in an amount such that the NCO/NH ratio is from 1 to 9.

Preferred R groups are secondary alkyl and, of these, the secondary butyl group is especially preferred. Examples of secondary and tertiary alkyl groups which may be used in the practice of this invention include iso-propyl,-sec-butyl, sec-pentyl, sec-hexyl, sec-heptyl, sec-octyl, sec-nonyl-sec-decyl, sec-undecyl, sec-dodecyl, sec-tridecyl, sec-tetradecyl, sec-pentaldecyl, sec-hexadecyl, sec-heptadecyl, sec-octadecyl, sec-nonadecyl, and sec-eicosyl moieties. Examples of secondary alkenyl groups are the unsaturated counterparts of the aforementioned alkyl groups. Tertiary alkyl or alkenyl groups, i.e., those which are fully substituted at the carbon atom bound to the nitrogen may be useful in the practice of this invention, but there is the risk that the size and/or shape of the molecule may prevent the reaction or slow it down due to hindrance.

The amount of diamine added to the multi-functional isocyanate is determined by the isocyanate/amine ratio, NCO/NH, which can be from amount 1 to about 9, and is preferably 3-7.

Additionally, the diamines can be blends of the above diamines or can be blended with another secondary diamine having a single aromatic ring with the following structural formula

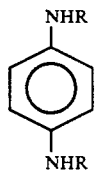

where R is selected from the group consisting of a monovalent alkyl- or alkenyl moiety containing from 3 to about 20 carbon atoms or a monovalent aromatic moiety containing from 6 to about 10 carbon atoms. Exemplary compounds useful in blends, in addition to the previously mentioned dianiline compounds are N,N'-di-sec-butyl-p-phenylene diamine and N,N'-di-sec-octyl-p-phenylene diamine.

The urea-modified polyisocyanurates are obtained by the following procedure. The reactants, including auxiliaries, are mixed in a conventional manner by bringing the "A-side", comprising the multi-functional isocyanate, into contact with the "B-side", comprising the remaining reactants, catalysts, curing agents, blowing agents, combustibility modifiers, surfactants, etc., into contact in a nozzle and directed onto a conveyor or into a mold. The foam cures in from about 12 to 18 hours and, preferably overnight at ambient temperatures.

The mixture of isocyanate-reactive components also may contain other materials, such as surfactants, combustibility modifiers, curing agents, etc. Examples of surfactants include the sodium salts of sulfonates or of fatty acids, amine salts of fatty acids, alkali metal or ammonium salts of sulfonic acids, polyether siloxanes, and the like. The component mixture also may contain pigments, dyes, flame retardants, stabilizers, plasticizers, fungicides and bactericides, and fillers.

EXAMPLES

General Preparation of the Polyurethane Foams. The procedure illustrates formulations based on the one-shot method; however, with minor modifications, it can be used in a two-stage process. The MDI-based isocyanate, PAPI 27, a widely used isocyanate for foams, which is a polymeric MDI (PMDI), is used to illustrate the invention, but other MDI-based isocyanates are available and may be used in the invention. The functionality of PAPI 27 is about 2.7.

Laboratory Scale. The diamine(s) of the examples, catalysts, foam stabilizers, water, and/or other blowing agents, and any other additives or auxiliaries were mixed by hand. The polyisocyanate, weighed out separately, was then added to the cup containing the mixture of isocyanate-reactive components and was thoroughly blended. This mixture was poured into a cardboard box and allowed to rise freely. The cream time, gel time and rise time were recorded. These samples were allowed to post-cure for one week at ambient temperature before testing.

Large Scale. The formulations below may also be used on a large scale by using low and high pressure foam machines, mixing machines which may or may not be attached to sprayers, and reaction injection molding machines.

Mechanical Properties. The mechanical properties of the foams produced in the following examples are determined by the following ASTM method Nos. (D-1622-36) density; compressive strength (D-1621-36) dimensional stability (D-2126-36); closed cell content; K factor (D-257-35) and percent closed cells (D-2856-36). Flammability is defined by the Butler Chimney Test (ASTM No. D-3014-36) or Limiting Oxygen Index (LOI) (ASTM #D-2863-35). Friability is measured by ASTM #C-421-18.

EXAMPLE I

Each of the formulations in Table 1 were used to make a rigid foam according to the invention. The blowing agent in samples 1 and 4 was CFC (F11A); HCFC 123 and HCFC 141b were used in Samples 2 and 3, respectively. The NCO/NH ratio was increased to 7 in Sample #4, using CFC-11 as the blowing agent to further decrease density. The sole source of active hydrogen in these samples is N,N'-di-sec-butyl4,4'-methylene dianiline (Unilink® 4200 available from UOP). The NCO/NH ratio was high (5) so that the foams contained only urea and isocyanurate linkages. The results shown in Table I indicate that the product foams were highly fire resistant (LOI as high as 27.5% and Butler Chimney Values up to 96.5%, and more isotropic than conventional rigid foams containing other linkages, such as urethane, etc., linkages.

TABLE 1

Formulation and Properties of Urea-Isocyanurate Foams (Physical Blowing Agent)

| Formulation | Sample No. | | | |
|---|---|---|---|---|
| | 1 | 2 | 3 | 4 |
| PAPI 27 PMDI | 134 | 134.0 | 134.0 | 134.0 |
| Unilink-4200 | 31.0 | 31.0 | 31.0 | 22.1 |
| L-5421-Silicone Surfactant | 2.0 | 31.0 | 31.0 | 22.1 |
| TMR-2 (Dalco) Trimerization Catalyst | 2.0 | 2.0 | 2.0 | 2.0 |
| CFC-11 | 20 | 0 | 0 | 35. |
| HCFC-123 | | 20 | 0 | 0 |
| HCFC-141b | | 0 | 20 | 0 |
| NCO/NH$_2$ Ratio | 5 | 5 | 5 | 7 |
| Reaction Profile | | | | |
| Cream Time (sec) | 13 | 13 | 13 | 16 |
| Rise Time (sec) | 31 | 40 | 63 | 47 |
| Physical Properties | | | | |
| Density, Kg/m = 3 (p.c.f.) | 41.9 (2.6) | 54.4 (3.4) | 36.6 (2.3) | 29.6 (1.9) |
| Compressive Strength, KPa (psi) | | | | |
| Parallel to rise | 269.8 (39.1) | 311.8 (45.2) | 156.6 (22.7) | 110.4 (16.0) |
| Perpendicular to rise | 151.8 (22.0) | 178.1 (25.9) | 90.3 (13.1) | 69.0 (10.0) |
| Coefficient to isotropicity Index (C.I.I.) | 1.8 | 1.8 | 1.7 | 1.6 |
| K-Factor, W/mK (BTU in/ft$^2$ hr °F.) | | | | |
| Initial | 0.022 (0.159) | 0.021 (0.151) | 0.027 (0.189) | 0.029 (0.199) |
| Flammability | | | | |
| Butler Chimney | 89 | 95.0 | 96.5 | 79 |

TABLE 1-continued

Formulation and Properties of Urea-Isocyanurate Foams
(Physical Blowing Agent)

| Formulation | Sample No. | | | |
|---|---|---|---|---|
| | 1 | 2 | 3 | 4 |
| (% wt. remained) | | | | |
| Oxygen Index | 26.0 | 27.0 | 27.5 | 24.0 |
| Friability | 12.0 | 8.1 | 7.3 | 33.0 |
| (% wt. loss) | | | | |
| Dimensional Stability (Percent Dimensional Change) | | | | |
| 50% R.H. at 70° C. | | | | |
| after 24 hr. | | | | |
| a | | | | 0.25 |
| b | | | | 0.0 |
| c | | | | 0.35 |
| vol | | | | 0.6 |
| after 1 week | | | | |
| a | | | | 0.63 |
| b | | | | 1.01 |
| c | | | | 1.75 |
| vol | | | | 3.5 |

1. polymeric diphenylmethane diisocyanate
2. N,N-di-sec-butyl 4,4'methylene dianiline

EXAMPLE II

The additional samples were prepared, in the same way as Example I, using water as the blowing agent, at NCO/NH ratio of 3,5 and 7, respectively, in Sample Nos. 1, 2, and 3. The results are shown in the following Table 2, indicating good dimensional stability and flame resistance, very low K-factors. Sample No. 4 was prepared using 50% water/50% CFC-11 blowing agents at NCO/NH$_2$ ratio of 7. Compressive strengths and isotropicity index were good to excellent.

TABLE 2

| Formulation | Sample No. | | | |
|---|---|---|---|---|
| | 1 | 2 | 3 | 4 |
| | 100% | 100% | 100% | 50% |
| PAPI 27 PMDI | 201 | 200 | 202 | 168 |
| Unilink-4200 | 51.6 | 31.0 | 22.1 | 22.1 |
| DC-5098 | 3.0 | 3.0 | 3.0 | 3.0 |
| TMR-2 (Dalco) | 1.5 | 1.5 | 1.5 | 1.5 |
| Polycat 41 | 0.5 | 0.5 | 0.5 | 0.5 |
| Dabco T-12 | 0.1 | 0.1 | 0.1 | 0.1 |
| Water | 4.5 | 4.4 | 4.6 | 2.3 |
| CFC-11 | 0 | 0 | 0 | 17.5 |
| NCO/NH ratio | 3 | 5 | 7 | 7 |
| Appearance | ok | ok | ok | ok |
| Reaction Profile | | | | |
| Cream Time (sec) | 9 | 9 | 8 | 9 |
| Gel Time (sec) | 48 | 51 | 51 | 57 |
| Rise Time | 76 | 66 | 69 | 71 |
| Physical Properties | | | | |
| Density, Kg/m$^3$ | 2.1 | 1.94 | 1.97 | 1.98 |
| | (33.6) | (31.0) | (31.5) | (31.7) |
| K-Factor, (BTU in/ft$^2$ hr °F.) | | | | |
| Initial | 0.194 | 0.182 | 0.186 | 0.184 |
| After 48 hrs. | 0.213 | 0.208 | 0.211 | 0.190 |
| After 1 week | 0.213 | 0.233 | 0.246 | 0.210 |
| Compressive Strength, (psi) | | | | |
| Parallel to rise | 22.3 | 22.4 | 17.7 | 29.6 |
| Perpendicular to rise | 19.0 | 19.4 | 14.9 | 15.9 |
| Coefficient of isotropicity Index (C.I.I.) | 1.2 | 1.2 | 1.2 | 1.9 |
| Flame Retardancy | | | | |
| Butler Chimney | 80 | 78 | 81 | 80 |
| (% wt. remained) | | | | |
| Oxygen Index | 22 | 22.5 | 23.5 | 24.0 |
| Friability (% wt. loss) | 20 | 36 | 34 | 41 |
| % Closed Cell | 81 | 67 | 86 | 78 |
| Dimensional Stability (Percent Dimensional Change) | | | | |
| (100% R.H. at 70° C.) | | | | |

TABLE 2-continued

| Formulation | Sample No. | | | |
|---|---|---|---|---|
| | 1 | 2 | 3 | 4 |
| After 24 hours | | | | |
| a | −0.6 | −0.2 | −0.4 | 0 |
| b | −0.4 | −0.6 | −0.4 | −0.8 |
| c | −0.4 | −0.4 | −0.2 | −1.0 |
| vol | −1.3 | −1.1 | −1.0 | −1.7 |
| After 1 week | | | | |
| a | −0.6 | 0.8 | −0.4 | 0 |
| b | −0.6 | 0.6 | −0.4 | −0.8 |
| c | −0.4 | 0.4 | −0.6 | −0.8 |
| vol | −1.5 | −1.7 | −1.3 | −1.5 |

EXAMPLE III

Three additional samples were prepared using a different diamine, N,N'-di-sec-octyl-methylene dianiline (UL-8100) in Sample #1, and blends of N,N'-di-sec-butyl-methylene dianiline (UL-4200 from UOP) with N,N'-di-sec-butyl-4,4'-phenylene diamine (UL-4100) (Sample #2) and di-sec-octyl-methylene dianiline (Sample #3). The formulations and results are shown in the following Table 3.

TABLE 3

Urea-modified Isocyanurate Foams Using Unilink 8100

| Formulation | Sample No. | | |
|---|---|---|---|
| | 1 (8100) | 2 (4200-4100) | 3 (8100-4200) |
| PAPI 27 | 134 | 200 | |
| UL-8100 | 33.2 | 0 | 17.2 |
| UL-4200 | 0 | 20.7 | 34.4 |
| UL-4100 | 0 | 7.3 | 0 |
| TMR-22.0 | 2.0 | 1.5 | |
| Polycat 41 | 0 | 0 | 2.5 |
| Dabco T-12 | 0 | — | 0.1 |
| CFC-11 | 20.0 | 25.0 | 0 |
| L-5421 | 2.0 | 2.0 | 0 |
| DC-5098 | 0 | 0 | 3.0 |
| Water 0 | 0 | 4.4 | |
| NCO/NH ratio | 5 | 5 | 3 |
| Reaction Profile | | | |
| Cream Time (sec) | 12 | 9 | 7 |
| Gel Time (sec) | — | 74 | 69 |
| Rise Time (sec) | 46 | 87 | ~90 |
| *Physical Properties | | | |
| Density, p.c.f. Kg/m$^3$ | 2.61 | 2.1 | 1.98 |
| | (41.8) | | |
| K-Factor, BTU in/ft$^2$ hr °F. | | | |
| Initial | 0.155 | 0.161 | 0.182 |
| After 24 hrs. | — | 0.168 | 0.188 |
| After 1 week | 0.024 | 0.181 | 0.198 |
| Compressive Strength KPa (psi) | | | |
| Parallel to rise | 32.0 | 31.1 | 23.2 |
| Perpendicular to rise | 27.3 | 18.3 | 19.0 |
| C.I.I. | 1.2 | 1.7 | 1.2 |
| Flammability | | | |
| Butler Chimney | 87 | 81 | 74 |
| (% wt. remained) | | | |
| Oxygen Index | 23.5 | 24.5 | 22.0 |
| Friability | 10 | 21 | 20 |
| (% wt. loss) | | | |
| % Closed Cell | 81 | 81 | 59 |

What is claimed:

1. A method for making a dimensionally stable rigid urea-modified polyisocyanurate having a density of from 1–12 pounds per cubic foot (p.c.f.), dimensional stability, at 100% relative humidity (R.H.) and 70° C., of less than 2% change in linear dimension in any direction and a limiting oxygen index (L.O.I.) greater than about 22 comprising reacting an organic polyisocyanate, a blowing agent and an N,N'-disubstituted aromatic diamine having the structure

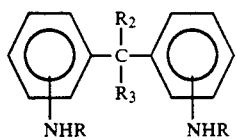

where R is selected from the group consisting of a monovalent alkyl or -alkenyl moiety containing from 3 to about 20 carbon atoms or a monovalent aromatic moiety containing from 6 to about 10 carbon atoms, $R_2$ is H or $C_1$, $C_2$ or $C_3$ alkyl and $R_3$ is H or $C_1$, $C_2$ or $C_3$ alkyl in an amount such that the $NCO/NH_2$ ratio is from 1 to 9 in the presence of a catalytically effective amount of a first catalyst which catalyzes the blowing reaction between an isocyanate and water, if water is used as a blowing agent and a second, trimerization catalyst which catalyzes the formation of isocyanurates, said diamine and an amine produced by water, if used as a blowing agent, constituting the sole sources of active hydrogen.

2. The method of claim 1 wherein said blowing agent comprises a halogenated hydrocarbon selected from the group consisting of chlorofluorocarbons, hydrochlorofluorocarbons, hydrofluoroalkanes, acetone, methylene chloride and methylchloroform.

3. The method of claim 1 wherein said blowing agent comprises water.

4. The method of claim 1 wherein said alkyl or alkenyl moiety is a secondary alkyl or alkenyl group.

5. The method of claim 4 wherein said alkyl or alkenyl moiety is secondary butyl.

6. The method of claim 4 wherein said alkyl or alkenyl moiety is iso-octyl.

7. The method of claim 1 wherein said NCO/NH ratio is from about 3 to about 7.

8. A dimensionally stable, rigid urea-modified polyisocyanurate having substantially no urethane linkages made by the process of claim 1.

* * * * *